US012378134B2

(12) United States Patent
Luk (10) Patent No.: US 12,378,134 B2
(45) Date of Patent: Aug. 5, 2025

(54) BOTTLE WITH FILTERING ARRANGEMENT

(71) Applicant: DAVE ECOMMERCE LIMITED, Hong Kong (HK)

(72) Inventor: Tai Wai Luk, Hong Kong (HK)

(*) Notice: Subject to any disclaimer, the term of this patent is extended or adjusted under 35 U.S.C. 154(b) by 509 days.

(21) Appl. No.: 17/369,082

(22) Filed: Jul. 7, 2021

(65) Prior Publication Data

US 2023/0009253 A1 Jan. 12, 2023

(51) Int. Cl.
*C02F 1/00* (2023.01)
*A47G 19/22* (2006.01)

(52) U.S. Cl.
CPC .......... *C02F 1/002* (2013.01); *A47G 19/2272* (2013.01); *C02F 2201/004* (2013.01); *C02F 2307/02* (2013.01)

(58) Field of Classification Search
CPC .......... C02F 1/002; C02F 2201/004; C02F 2307/02; A47G 19/2272; A47G 19/2266
See application file for complete search history.

(56) References Cited

U.S. PATENT DOCUMENTS

| 2010/0102002 | A1* | 4/2010 | O'Brien | C02F 1/002 |
| | | | | 210/228 |
| 2015/0307265 | A1* | 10/2015 | Winn | C02F 1/688 |
| | | | | 426/66 |
| 2018/0044201 | A1* | 2/2018 | Metaxatos | B65D 47/06 |

* cited by examiner

*Primary Examiner* — Hayden Brewster
(74) *Attorney, Agent, or Firm* — Tsz Lung Yeung (57) ABSTRACT

A bottle includes a main body having a receiving cavity, a straw, and a filtering arrangement. The filtering arrangement includes a guider housing disposed in the receiving cavity. The guider housing has a filter cavity, a plurality of liquid input slots communicating the receiving cavity with the filter cavity, and at least one liquid output slot connecting with the straw. The filter core is received in the filter cavity, such that when a suction force is applied through the straw, the liquid in the receiving cavity is arranged to pass through the liquid input slots and contact with the filter core for filtering unwanted substances from the liquid. Filtered liquid from the filter core is arranged to be discharged out of the receiving cavity through the straw.

14 Claims, 6 Drawing Sheets

BOTTLE WITH FILTERING ARRANGEMENT

BACKGROUND OF THE PRESENT INVENTION

Field of Invention

The present invention relates to a bottle, and more particularly to a bottle comprising a filtering arrangement which is capable of conveniently filtering unwanted substances from the liquid stored in the bottle before the liquid is consumed by a user.

Description of Related Arts

A conventional bottle, such as a portable water bottle, usually comprises a main body having a receiving cavity for storing a predetermined amount of liquid such as water, and a cap detachably attached on the main body. The cap may have a through hole for communicating the receiving cavity with an exterior of the bottle. A mouth piece may be provided on the cap and a straw may extend from the cap to reach the receiving cavity for allowing a user to drink the liquid stored therein with ease and comfort.

A major disadvantage of conventional bottles such as the one described above is that they do not have any filtering mechanism for filtering unwanted substances from the liquid before consumption by the user. This problem is especially true when one is talking about those bottles which are designed to be portable and for use in outdoor environment.

As a result, there is a need to improve upon conventional portable bottles and so as to allow them to be able to filter unwanted substances from the liquid they hold before it is consumed by their users.

SUMMARY OF THE PRESENT INVENTION

Certain variations of the present invention provide a bottle comprising a filtering arrangement which is capable of conveniently filtering unwanted substances from the liquid stored in the bottle before the liquid is consumed by a user.

Certain variations of the present invention provide a bottle comprising a filtering arrangement which capable of conveniently filtering unwanted substances from the liquid stored in the bottle while the bottle is being carried by the user for outdoor use.

In one aspect of the present invention, it provides a bottle, comprising:

a main body having a receiving cavity for storing a predetermined amount of liquid;

a straw extending in the main body; and a filtering arrangement, which comprises:

a guider housing unit disposed in the receiving cavity, the guider housing having a filter cavity, and a plurality of liquid input slots communicating the receiving cavity with the filter cavity, and at least one liquid output slot connecting with the straw; and a filter core received in the filter cavity, such that when a suction force is applied through the straw, the liquid in the receiving cavity is arranged to pass through the liquid input slots and contact with the filter core for filtering unwanted substances from the liquid, filtered liquid from the filter core being arranged to be discharged out of the receiving cavity through the straw.

This summary presented above is provided merely to introduce certain concepts and not to identify any key or essential features of the claimed subject matter.

DETAILED DESCRIPTION OF THE PREFERRED EMBODIMENT

The following detailed description of the preferred embodiment is the preferred mode of carrying out the invention. The description is not to be taken in any limiting sense. It is presented for the purpose of illustrating the general principles of the present invention.

Referring to FIG. 1 to FIG. 6 of the drawings, a bottle according to a preferred embodiment of the present invention is illustrated. The bottle may be used for storing a predetermined amount of liquid, such as water, and may be designed to be portable and for use in outdoor environment such as when a user is exercising. Broadly, the bottle may comprise a main body 10, a straw 20, and a filtering arrangement 30.

Figure 1:
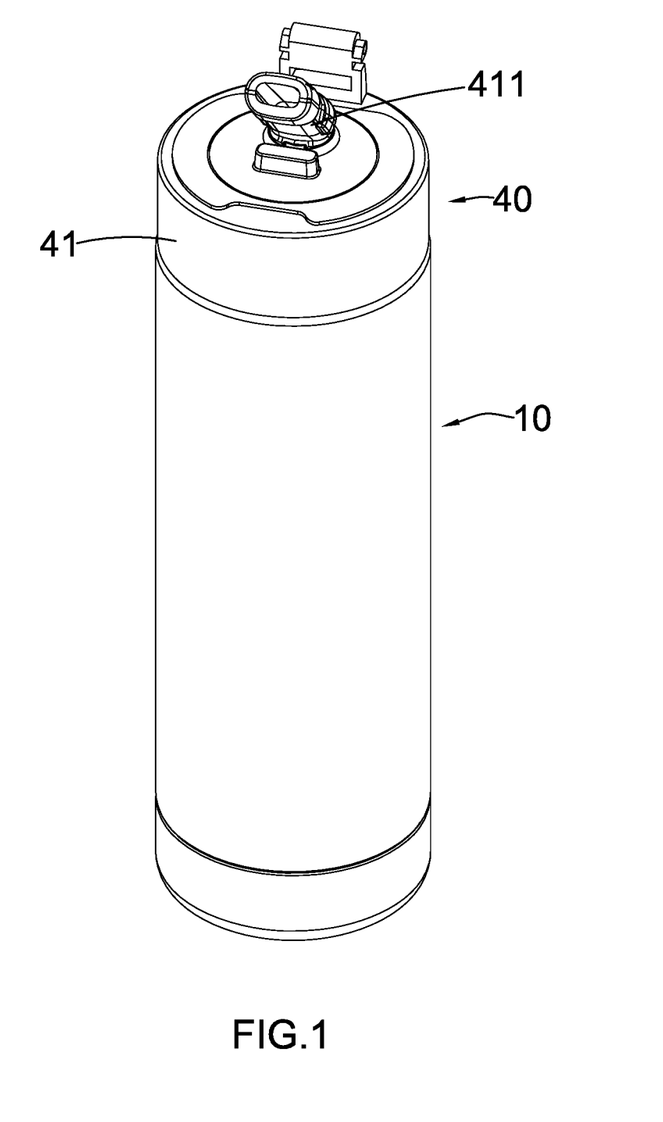
FIG. 1 a perspective view of a bottle according to a preferred embodiment of the present invention.
Figure 3:
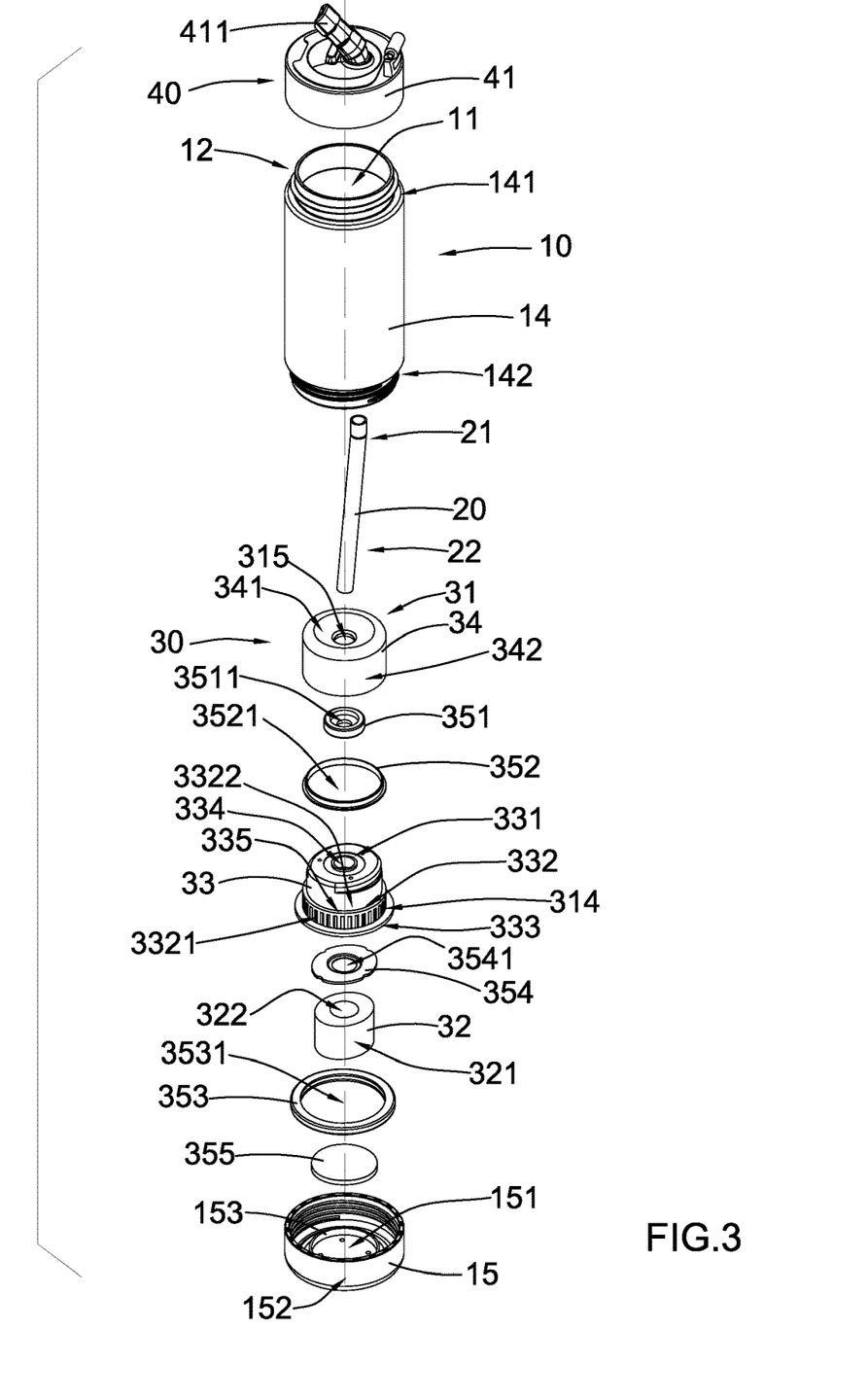
FIG. 3 is an exploded perspective view of the bottle according to the preferred embodiment of the present invention.
Figure 4:
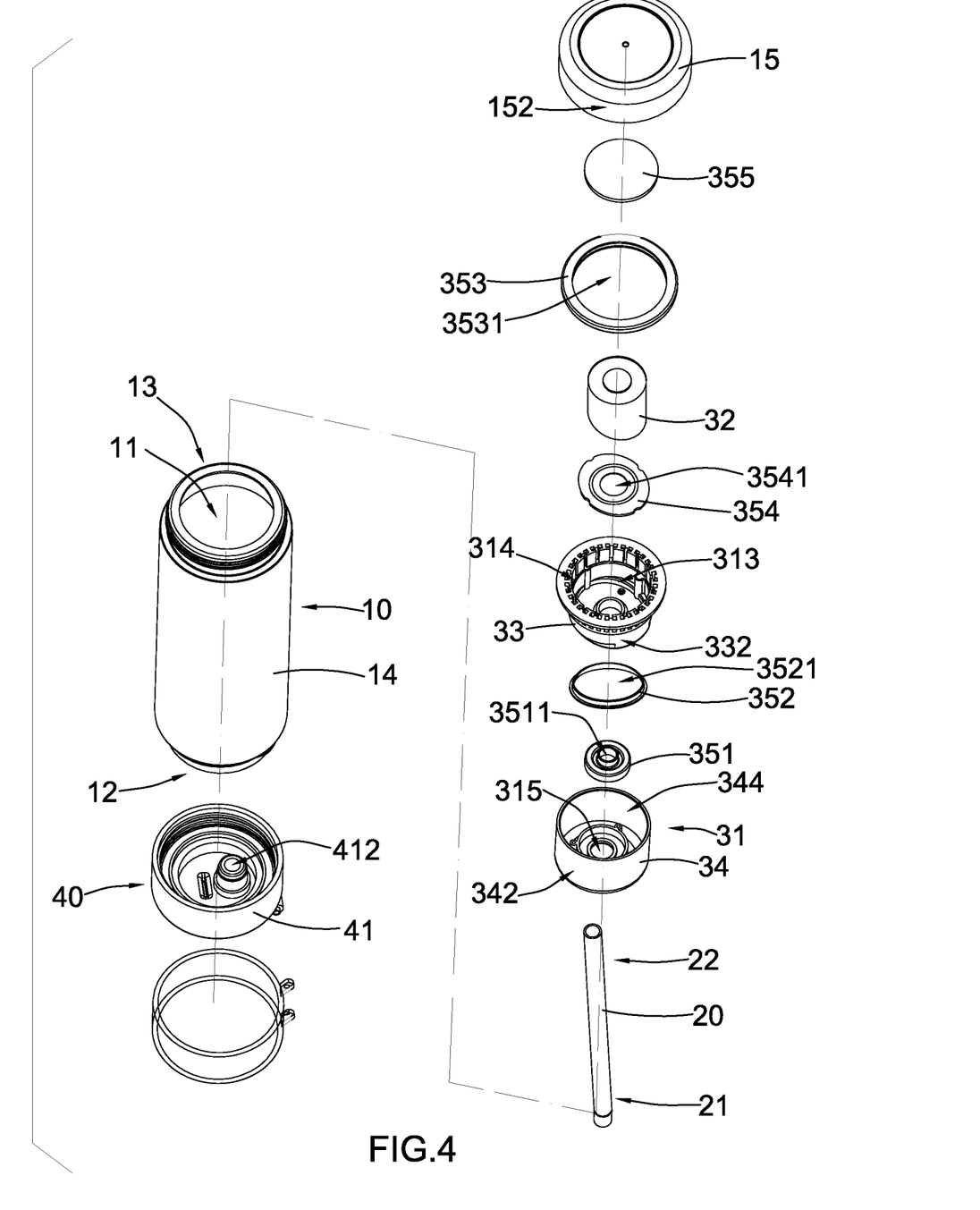
FIG. 4 is another exploded perspective view of the bottle according to the preferred embodiment of the present invention.

The main body 10 may have a receiving cavity 11 for storing a predetermined amount of liquid, such as water. The straw 20 may extend in the main body 10.

Figure 2:
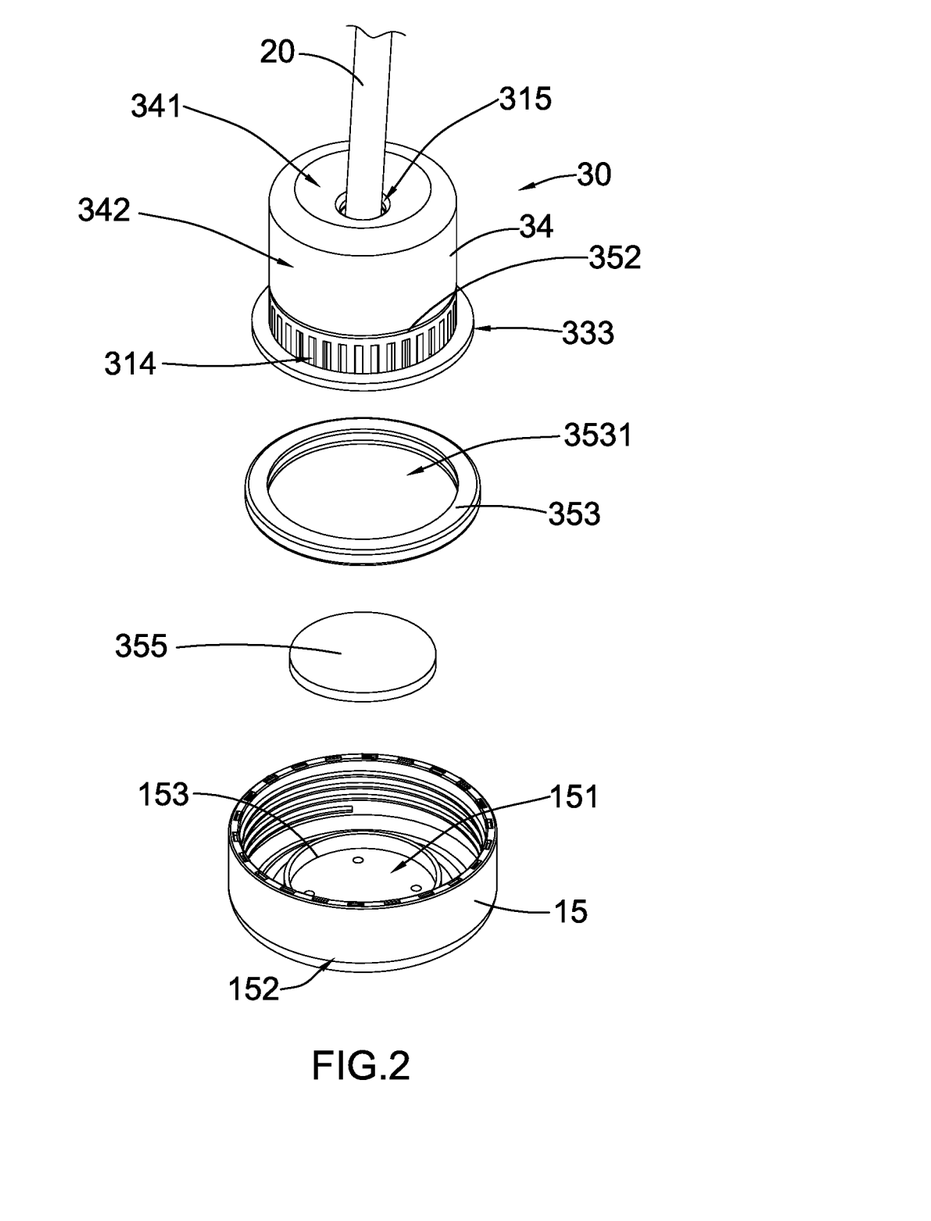
FIG. 2 a perspective view of a guiding housing of the bottle according to the preferred embodiment of the present invention.

The filtering arrangement 30 may comprise a guider housing 31 and a filer core 32. The guider housing 31 may be disposed in the receiving cavity 11. The guider housing 31 may have a filter cavity 313, a plurality of liquid input slots 314 communicating the receiving cavity 11 with the filter cavity 313, and at least one liquid output slot 315 connecting with the straw 20.

The filter core 32 may be received in the filter cavity 313, such that when a suction force is applied through the straw 20, the liquid in the receiving cavity 11 is arranged to pass through the liquid input slots 314 and contact with the filter core 32 for filtering unwanted substances from the liquid, filtered liquid from the filter core 32 may be arranged to be discharged out of the receiving cavity 11 through the straw 20.

According to the preferred embodiment of the present invention, the main body 10 may comprise a tubular member 14 and a base member 15 detachably attached on the tubular member 14 for facilitating easy assembling of the filtering arrangement 30 in the receiving cavity 11.

Specifically, the tubular member 14 may have a tubular structure in which part of the receiving cavity 11 is formed therein, a top opening 12 formed on a top portion 141 thereof, and a bottom opening 13 formed on a bottom portion 142 of the tubular body 14. On the other hand, the base member 15 may be detachably attached on the bottom portion 142 of the tubular member 14 so as to selectively enclose the bottom opening 13 thereof. The top portion 141 and the bottom portion 142 may be threaded for threadedly connecting with a cap 40 (described below) and the base member 15 respectively.

The base member 15 may have a bottom wall 151 and a sidewall 152 peripherally and upwardly extended from the bottom wall 151, wherein the space surrounded by the bottom wall 151 and the sidewall 152 may be defined as part of the receiving cavity 11 when the base member 15 is detachably attached on the bottom portion 142 of the tubular member 14. As shown in FIG. 3 of the drawings, the base member 15 may further have a boundary member 153 extended from the bottom wall 151 for receiving the filter core 32 in the space surrounded by the boundary member 153. In this preferred embodiment, the boundary member 153 may have an annular structure protruded from the bottom wall 151.

The bottle may further comprise a cap 40 detachably attached on a top portion 141 of the tubular member 14 for selectively enclosing the receiving cavity 11 from the top. The cap 40 may comprise a cap body 41 having a mouth piece 411 formed thereon. The cap body 41 may further have a through opening 412 communicating with the top opening 12 of the tubular member 14 and the receiving cavity 11. A cover 50 may be pivotally attached on the cap 40 for selectively covering the mouth piece 411.

The straw 20 may have an elongated and tubular structure and may have an upper end portion 21 mounted on the cap body 41, while the remaining part of the straw 20 may extend downwardly to the receiving cavity 11.

The guider housing 31 of the filtering arrangement 30 may be disposed on the base member 15 and positioned at the bottom portion 142 of the tubular member 14 in the receiving cavity 11. According to the preferred embodiment of the present invention, the guider housing 31 may comprise an inner guiding member 33 and an outer guiding member 34 attached on the inner guiding member 33.

As shown in FIG. 3 to FIG. 4 of the drawings, the inner guiding member 33 may have an inner top wall 331 and an inner peripheral wall 332 extended from the inner top wall 311 to form a tubular structure, wherein the liquid input slots 314 may be formed on the inner peripheral wall 332 while the filter cavity 313 may be formed in the space surrounded by the inner top wall 331 and the inner peripheral wall 332.

In this preferred embodiment, inner guiding member 33 may have a circular cross section when viewed from the top. The inner guiding member 33 may further have a boundary rim 333 peripherally, outwardly and concentrically extended from the inner peripheral wall 332 Furthermore, the inner guiding member 33 may have an inner through hole 334 formed on the inner top wall 331. The inner guiding member 33 may further have a securing ridge 335 formed on the inner peripheral wall 332 at a position above the liquid input slots 314 for securing a position of the outer guiding member 34 when it is attached on the inner guiding member 35 (described below). In other words, the inner peripheral wall 332 may have an enlarged wall portion 3321 and a contracted wall portion 3322 wherein a diameter of the enlarged wall portion 3321 may be larger than that of the contracted wall portion 3322 to form the securing ridge 335 at the boundary between the enlarged wall portion 3321 and the contracted wall portion 3322.

The outer guiding member 34 may have an outer top wall 341, an outer peripheral wall 342 downwardly extended from the outer top wall 341 to form a mounting cavity 344 as the space surrounded by the outer top wall 341 and the outer peripheral wall 342. Thus, the outer guiding member 34 may also be configured as having a tubular structure. The outer guiding member 34 may further have an outer through hole 343 formed on the outer top wall 341, in such a manner that when the outer guiding member 34 is detachably attached on the inner guiding member 33, the inner through hole 333 and the outer through hole 343 may align with each other to form the liquid output slot 315.

A lower end portion 22 of the straw 20 may be connected to the liquid output slot 315 for allowing liquid from the filter cavity 313 to be sucked out of the main body 10 and consumed by a user of the present invention.

As shown in FIG. 3 of the drawings, the outer top wall 341 may have a concave contour so that a height of the outer top wall 341 may gradually decrease from a peripheral edge portion thereof toward a center portion of the outer top wall 341. Moreover, the outer top wall 341 may also have a circular cross section when viewed from the top, wherein a diameter of the outer top wall 341 is larger than that of the inner top wall 331 so as to allow the outer guiding member 34 to attach on the inner guiding member 33, in such a manner that part of the inner guiding member 33 may accommodate in the mounting cavity 344 of the outer guiding member 34.

Furthermore, when the outer guiding member 34 is attached on the inner guiding member 33 in the manner described above, the outer peripheral wall 342 may be arranged to bias against the securing ridge 335 of the inner guiding member 33 so as to securely position the outer guiding member 34 on the inner guiding member 33 to form the guider housing 31. At the same time, the liquid input slots 314 may be kept exposed to the receiving cavity 11 so that liquid such as water in the receiving cavity 11 may enter the filter cavity 313 through the liquid input slots 314.

The filtering arrangement 30 may further comprise a plurality of sealing rings mounted in the guider housing 31 for guiding liquid stored in the receiving cavity 11 to enter the filter cavity 313 only through the liquid input slots 314. In this preferred embodiment, the filtering arrangement 30 may comprise first through fifth sealing rings 351, 352, 353, 354, 355. They may be collectively termed as sealing rings. Each of the sealing rings may be configured as soft, elastic, and waterproof material, such as rubber or silicone rubber.

In particular, the first sealing ring 351 may have a first hole 3511 and may be mounted on a bottom side of the outer top wall 341 and above the inner top wall 331. In other words, the first sealing ring 351 may be sandwiched between the outer top wall 341 and the inner top wall 331. The first hole 3511 may be aligned with the inner through hole 334 and the outer through hole 343. The first sealing ring 351 may prevent liquid from the receiving cavity 11 from entering the filter cavity 313 through the liquid output slot 315 through the gap between the straw 20 and a boundary of liquid output slot 315.

As shown in FIG. 3 to FIG. 6 of the drawings, the first sealing ring 351 may have a main sealing portion 3512 and an auxiliary sealing portion 3513 downwardly extended from the main sealing portion 3512. Each of the main sealing portion 3512 and the auxiliary sealing portion 3513 may have a circular cross section in which a diameter of the auxiliary sealing portion 3513 is smaller than that of the main sealing portion 3512. Moreover, the first sealing ring 351 may have a bottom indention 3514 circumferentially and indentedly formed on a bottom surface 3516 of the first sealing ring 351 around a circumferential edge of the inner through hole 334, and a top indention 3515 circumferentially and indentedly formed on a top surface 3517 of the first sealing ring 351.

On the other hand, the inner guiding member 33 may further have a sealing groove 336 indently formed on the inner top wall 331 and circumferentially surrounding the inner through hole 334. The sealing groove 336 may be configured to have an annular structure and may be coaxially arranged with the inner through hole 334. An external diameter of the main sealing portion 3512 is substantially the same as an external diameter of the sealing groove 336. The inner guiding member 33 may further have a sealing protrusion 337 upwardly protruded with respect to the inner top wall 331 and arranged to receive in the bottom indention 3514 when the outer guiding member 34 is attached on the inner guiding member 33, and the first sealing ring 351 is sandwiched between the outer guiding member 34 and the inner guiding member 33.

Thus, when the outer guiding member 34 is attached on the inner guiding member 33, the first sealing ring 351 may be sandwich between the inner guiding member 34 and the outer guiding member 35 in such a manner that the auxiliary sealing portion 3513 may be inserted into the inner through hole 334, while the sealing protrusion 337 may be received in the bottom indention 3514 of the first sealing ring 351.

Figure 5:
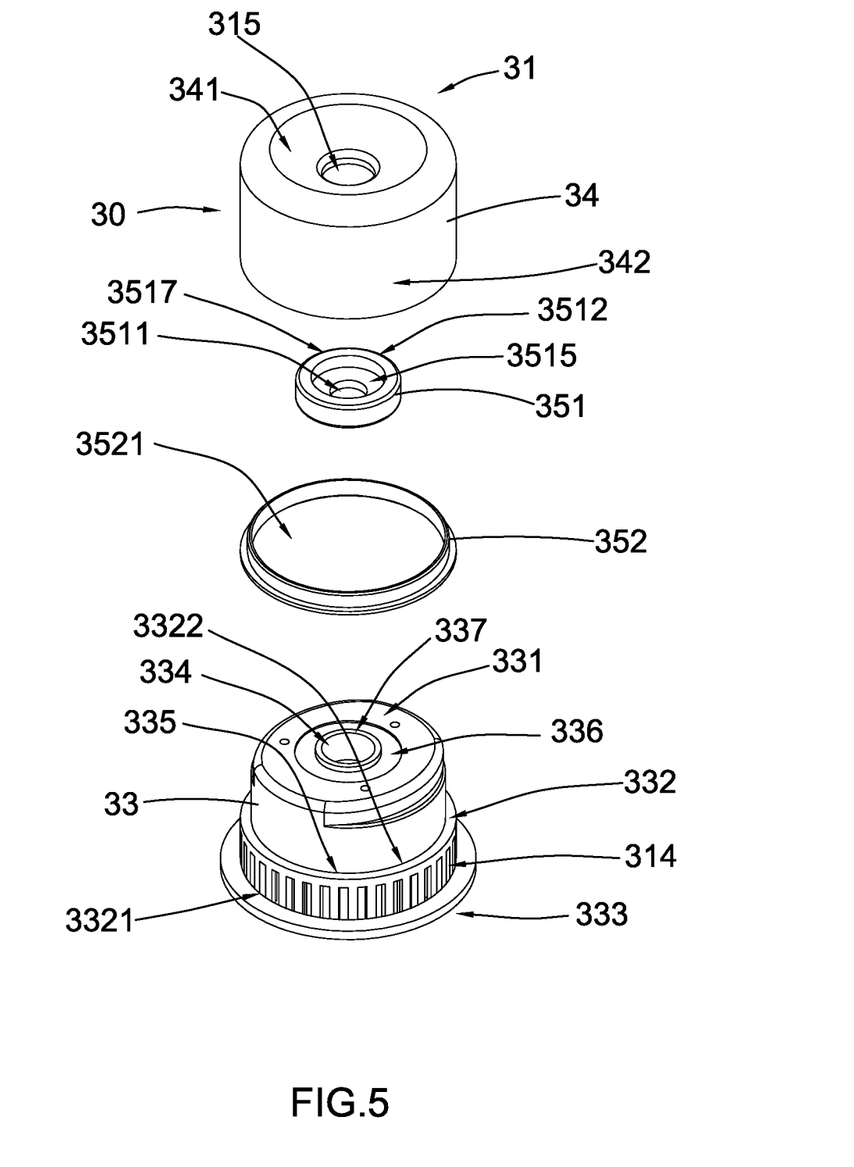
FIG. 5 is a schematic diagram of a guider housing of the bottle according to the preferred embodiment of the present invention, illustrating the guiding housing from the top.
Figure 6:
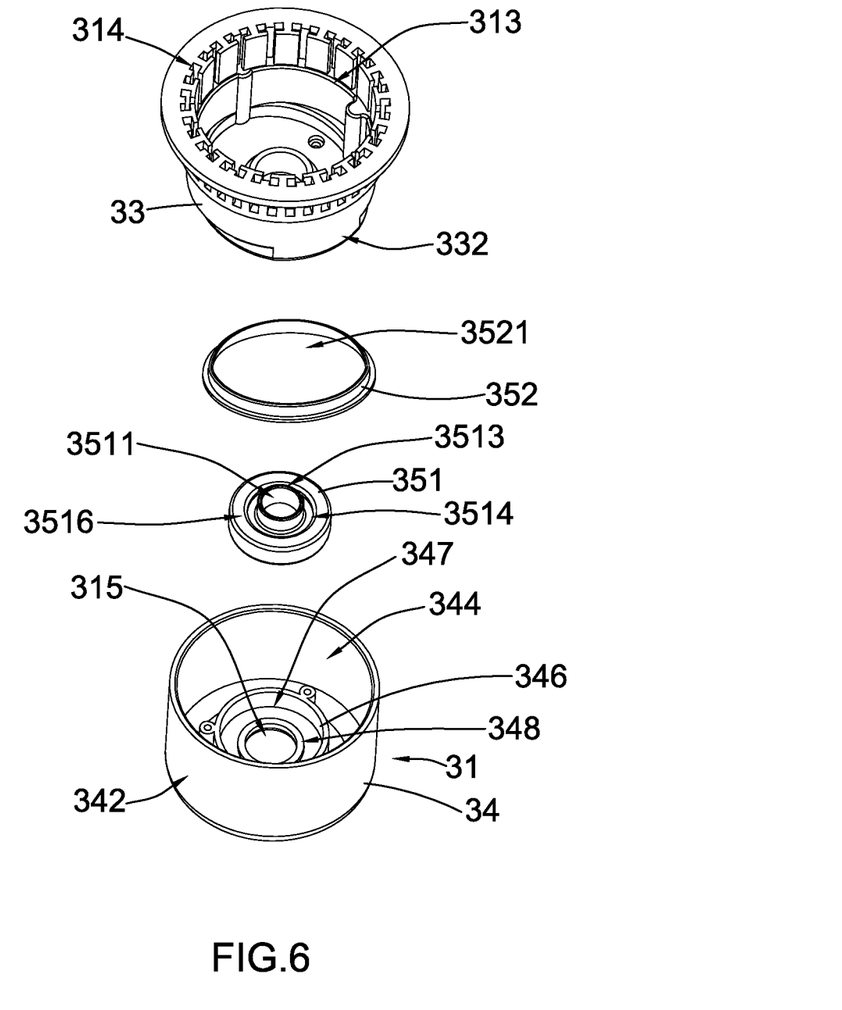
FIG. 6 is a schematic diagram of a guider housing of the bottle according to the preferred embodiment of the present invention, illustrating the guiding housing from the bottom.

As shown in FIG. 5 to FIG. 6 of the drawings, the outer guiding member 34 may further comprise a top boundary wall 346 extended from a bottom side of the outer top wall 341 to form a sealing cavity 347 as a space surrounded by the top boundary wall 346. When the inner guiding member 34 is attached on the outer guiding member 33, the first sealing ring 351 may be received in the sealing cavity 347. Moreover, the outer guiding member 34 may further have a sealing rim 348 downwardly protruded from a bottom side of the outer top wall at a position within the sealing cavity 347. The sealing rim 348 may downwardly protrude from a circumferential edge of the inner through hole 334. A height of the sealing rim 348 is shorter than that of the top boundary wall 346. When the inner guiding member 34 is attached on the outer guiding member 33, the first sealing ring 351 may be received in the sealing cavity 347 while the sealing rim 348 may be received in the top indention 3515 of the first sealing ring 351.

This structural arrangement for the outer guiding member 34 and the inner guiding member 33 and the first sealing ring 351 may facilitate tight sealing and prevent water from entering the filter cavity 313 through the inner through hole 334.

The second sealing ring 352 may have a second hole 3521 and may be mounted on the securing ridge 335 of the inner guiding member 33 for preventing liquid stored in the receiving cavity 11 from entering the filter cavity 313 through the gap between the inner guiding member 33 and the outer guiding member 34.

The third sealing ring 353 may have a third hole 3531 and may be mounted on the boundary rim 333 of the inner guiding member 33 for preventing liquid stored in the receiving cavity 11 from entering the filter cavity 313 through the gap between the boundary rim 333 and bottom wall 151 of the base member 15.

The fourth sealing ring 354 may have a fourth hole 3541 and may be mounted underneath the inner top wall 331 of the inner guiding member 33 for further preventing liquid from the receiving cavity 11 from entering the filter cavity 313 through the liquid output slot 315 through the gap between the straw 20 and side boundary of liquid output slot 315.

The filter core 32 may be received in the filter cavity 313. According to the preferred embodiment of the present invention, the filter core 32 may be configured as having an annular structure and may have a filter portion 321 and a through filter hole 322 surrounded by the filter portion 321. The filter portion 321 may be configured from material arranged to filter unwanted substances. For example, the filter portion 321 may be formed by porous composite material which is capable of blocking unwanted substances while allowing liquid, such as water, from passing through. An exemplary filter material may be composite material having active carbon. Note that the filter portion 321 may be mounted adjacent to the liquid input slots 314 and may be sized and shaped to correspond to the cross sectional shape of the inner guiding member 33. This structure ensures that the liquid may be maximally guided to pass through the liquid input slots 314 and the filter portion 321. The filter hole 322 may be positioned aligning with the lower end portion 22 of the straw 20 which may be mounted at the liquid outlet slot 315.

The fifth sealing ring 355 may have a circular cross sectional shape and may be mounted on the base member 15 at a position within the boundary member 153 for preventing water from entering the filter hole 322 through the gap between the filter core 32 and the boundary member 153 at a bottom side of the filter core 32.

The operation of the present invention may be described as follows: a user may fill the bottle with a predetermined amount of liquid, such as water. When the cap 40 is attached on the main body 10, the bottle may become portable and may be carried by the user to outdoor environment. When the user wishes to drink the water in the bottle, he may need to suck on the mouth piece 411 may apply a suction force. The water stored in the receiving cavity 11 may be driven by the suction force and enter the filtering cavity through the liquid input slots 314. The water may then pass through the filter portion 321 of the filter core 32 with the unwanted substances blocked by the filter core 32. The filtered water may then be sucked into the straw 20 and flow to the upper end portion 21 through the liquid outlet slot 315 and may be eventually consumed by the user.

The present invention, while illustrated and described in terms of a preferred embodiment and several alternatives, is not limited to the particular description contained in this specification. Additional alternative or equivalent components could also be used to practice the present invention.

What is claimed is:

1. A bottle, comprising:
   a main body having a receiving cavity for storing a predetermined amount of liquid, said main body comprising a tubular member and a base member detachably attached on said tubular member, said tubular member having a tubular structure in which part of said receiving cavity is formed therein, a top opening formed on a top portion thereof, and a bottom opening formed on a bottom portion of said tubular body, said base member being detachably attached on said bottom portion of said tubular member so as to selectively enclose said bottom opening thereof;
   a straw extending in said main body; and
   a filtering arrangement, which comprises:
   a guider housing disposed in said receiving cavity, said guider housing having a filter cavity, and a plurality of liquid input slots communicating said receiving cavity with said filter cavity, and a liquid output slot connecting with said straw; and a filter core received in said filter cavity, such that when a suction force is applied through said straw, said liquid in said receiving cavity is arranged to pass through said plurality of liquid input slots and contact with said filter core for filtering unwanted substances from said liquid, filtered liquid from said filter core being arranged to be discharged out of said receiving cavity through said straw, said base member having a bottom wall, a sidewall peripherally and upwardly extended from said bottom wall, and a boundary member extended from said bottom wall for receiving said filter core in a space surrounded by said boundary member;

said guider housing comprising an inner guiding member and an outer guiding member attached on said inner guiding member, said guider housing being disposed on said base member and positioned at said bottom portion of said tubular member in said receiving cavity;

said outer guiding member having an outer top wall, an outer peripheral wall downwardly extended from said outer top wall to form a mounting cavity as a space surrounded by said outer top wall and said outer peripheral wall, said inner guiding member having an inner through hole formed on said inner top wall, said outer guiding member having an outer through hole formed on said outer top wall, in such a manner that when said outer guiding member is detachably attached on said inner guiding member, said inner through hole and said outer through hole is arranged to align with each other to form said liquid output slot;

said filtering arrangement further comprising a first sealing ring which has a first hole and is mounted on a bottom side of said outer top wall and above said inner top wall so that said first sealing ring is sandwiched between said outer top wall and said inner top wall.

2. The bottle, as recited in claim 1, wherein said inner guiding member has an inner top wall and an inner peripheral wall extended from said inner top wall to form a tubular structure of said inner guiding member, wherein said plurality of liquid input slots are formed on said inner peripheral wall while said filter cavity is formed in a space surrounded by said inner top wall and said inner peripheral wall.

3. The bottle, as recited in claim 2, wherein said inner guiding member has a circular cross section and further has a boundary rim peripherally, outwardly and concentrically extended from said inner peripheral wall.

4. The bottle, as recited in claim 3, wherein said inner guiding member further has a securing ridge formed on said inner peripheral wall at a position above said plurality of liquid input slots for securing a position of said outer guiding member when said outer guiding member is attached on said inner guiding member.

5. The bottle, as recited in claim 4, wherein said outer top wall of said outer guiding member has a concave contour so that a height of said outer top wall gradually decreases from a peripheral edge portion thereof toward a center portion of said outer top wall, said outer top wall having a circular cross section, wherein a diameter of said outer top wall is larger than that of said inner top wall so as to allow said outer guiding member to attach on said inner guiding member, such that part of said inner guiding member is accommodated in said mounting cavity of said outer guiding member.

6. The bottle, as recited in claim 5, wherein said filtering arrangement further comprises a second sealing ring which has a second hole and is mounted on said securing ridge of said inner guiding member for preventing liquid stored in said receiving cavity from entering said filter cavity through a gap between said inner guiding member and said outer guiding member.

7. The bottle, as recited in claim 5, wherein said filtering arrangement further comprises a third sealing ring which has a third hole and is mounted on said boundary rim of said inner guiding member for preventing liquid stored in said receiving cavity from entering said filter cavity through a gap between said boundary rim and said bottom wall of said base member.

8. The bottle, as recited in claim 5, wherein said filtering arrangement further comprises a fourth sealing ring which has a fourth hole and is mounted underneath said inner top wall of said inner guiding member for further preventing liquid from said receiving cavity from entering said filter cavity through said liquid output slot.

9. The bottle, as recited in claim 8, wherein said filter core is configured as having an annular structure and has a filter portion and a through filter hole surrounded by said filter portion, said filter portion being mounted adjacent to said plurality of liquid input slots and is sized and shaped to correspond to that of said inner guiding member, said filter hole being positioned aligning with a lower end portion of said straw.

10. The bottle, as recited in claim 9, wherein said filtering arrangement further comprises a fifth sealing ring which is mounted on said base member at a position within said boundary member for preventing water from entering the filter hole through a gap between said filter core and said boundary member at a bottom side of said filter core.

11. The bottle, as recited in claim 5, wherein said first sealing ring has a main sealing portion and an auxiliary sealing portion downwardly extended from said main sealing portion, said first sealing ring further having a bottom indention circumferentially and indentedly formed on a bottom surface of said first sealing ring around a circumferential edge of said inner through hole, and a top indention circumferentially and indentedly formed on a top surface of said first sealing ring.

12. The bottle, as recited in claim 11, wherein said inner guiding member further has a sealing groove indently formed on said inner top wall and circumferentially surrounding said inner through hole, and a sealing protrusion upwardly protruded with respect to said inner top wall and arranged to receive in said bottom indention when said outer guiding member is attached on said inner guiding member, and said first sealing ring is sandwiched between said outer guiding member and said inner guiding member.

13. The bottle, as recited in claim 12, wherein said outer guiding member further comprises a top boundary wall extended from a bottom side of said outer top wall to form a sealing cavity as a space surrounded by said top boundary wall, wherein said first sealing ring is received in said sealing cavity when said outer guiding member is attached on said inner guiding member.

14. The bottle, as recited in claim 13, wherein said outer guiding member further has a sealing rim downwardly protruded from a bottom side of said outer top wall at a position within said sealing cavity, said sealing rim downwardly protruding from a circumferential edge of said inner through hole, a height of said sealing rim being shorter than that of said top boundary wall, so that when said inner guiding member is attached on said outer guiding member, said first sealing ring is received in said sealing cavity and the sealing rim is arranged to be inserted in said top indention of said first sealing ring.

\* \* \* \* \*